United States Patent Office 2,843,627
Patented July 15, 1958

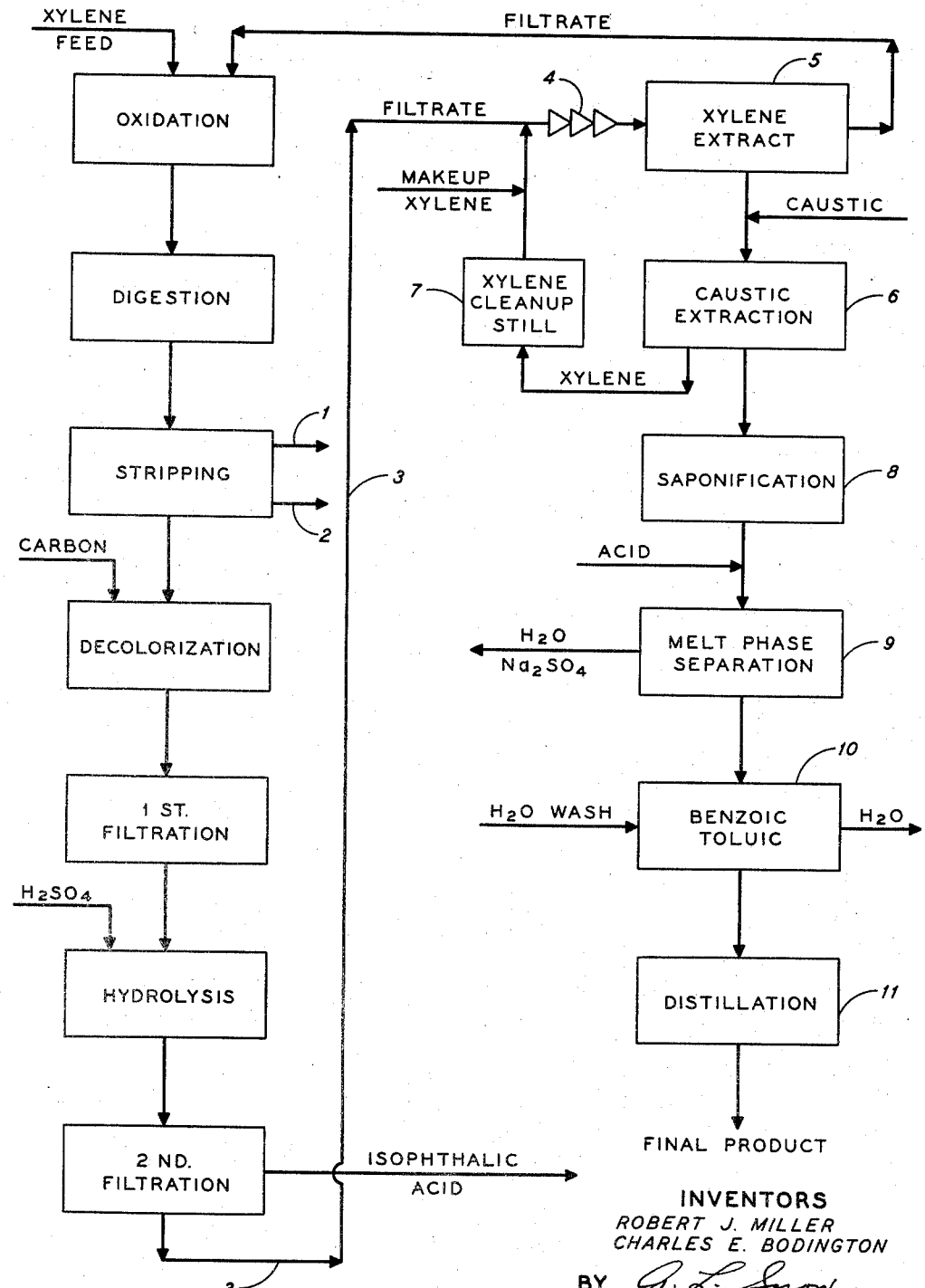

2,843,627

RECOVERY OF BENZOIC AND TOLUIC ACIDS FROM DILUTE AQUEOUS SOLUTIONS THEREOF

Robert J. Miller, Lafayette, and Charles E. Bodington, San Anselmo, Calif., assignors to California Research Corporation, San Francisco, Calif., a corporation of Delaware Application November 7, 1955, Serial No. 545,252

1 Claim. (Cl. 260—525)

This invention relates to a process for recovering benzoic acid and toluic acid from dilute aqueous solutions thereof. More particularly, the invention relates to a process for recovering from their dilute aqueous solutions benzoic acid and toluic acid of sufficiently high purity for use in the manufacture of alkyd resins.

U. S. Patent No. 2,610,980 describes a process for oxidizing alkyl benzenes to produce amides of aromatic carboxylic acids. The acids themselves can be recovered from the amide reaction product by acidification, hydrolyzing the amide, and separating the acid from the hydrolysis reaction product. When the process described in this patent is employed to produce isophthalic acid or terephthalic acid by oxidizing meta-xylene or para-xylene, the crude reaction product contains not only the amides of phthalic acids, but also benzamide and amides of toluic acid. When this crude reaction product is acidified and hydrolyzed, for example by heating it with water or with an aqueous solution of a strong acid, such as sulfuric acid or hydrochloric acid, and the hydrolysis mixture is cooled, the phthalic acids are precipitated. The cooled hydrolysis reaction product is then filtered to recover phthalic acids as a filter cake and a filtrate is produced which contains minor amounts of benzoic acid, toluic acid, phthalic acid, and the amides of these acids, each of the acids being present at concentrations ordinarily in the range from about 0.1 to 3% by weight.

In a more recently developed process, a xylene is contacted with ammonium sulfate, at least one sulfide of the group consisting of hydrogen sulfide, ammonium sulfide and ammonium polysulfide, and water in a reaction zone at a temperature from about 550° F. to the critical temperature of water under superatmospheric pressure sufficient to maintain a part of the water in liquid phase, acidifying the reaction product and filtering it to recover a filter cake comprising phthalic acid values, hydrolyzing the filter cake by heating it with water and filtering the hydrolyzate to separate phthalic acids and a filtrate comprising aqueous ammonium sulfate containing small amounts of benzoic acid, toluic acid, phthalic acid, and their amides. The amounts of these materials, by weight, may range .2% to 2% benzoic acid; .1% to .5% toluic acid; 0.1% to 2% phthalic acid; and about .05% to .5% amides. In addition to the organic acids, the filtrate has a substantial content of ammonium sulfate, ammonium bisulfate, or ammonium chloride.

As above indicated, the benzoic-toluic acid values contained in the filtrate, which is obtained following the recovery of the phthalic acids, are required to be of high purity as measured by their nitrogen content, expressed as ammonia. Thus, if the acids are to be used in the manufacture of alkyd resins it is necessary that they be almost completely free of amide nitrogen. The amide nitrogen content of the acid is required to be below 0.03% by weight and preferably below 0.01% by weight when the acid is to be used in alkyd manufacture. The presence of very small amounts of amide nitrogen causes discoloration of the alkyd resins during the conventional alkyd cook. When the amide nitrogen content of the acid is 0.01% by weight, the Gardner color of the alkyds produced by conventional methods is in a range from 5 to 6. If the amide nitrogen content of the acid is as high as 0.04% by weight, the alkyd resins produced from the acid are much too dark to be commercially acceptable. If, on the other hand, the amide nitrogen content of the acid is reduced below 0.01% by weight, alkyd resins having Gardner color values of 3 to 4 are readily produced.

Accordingly, a principal object of the invention is to recover benzoic acid and toluic acid from dilute aqueous solutions thereof in sufficiently pure form to be useful in the manufacture of alkyd resins.

Broadly, the invention contemplates a process which comprises contacting a xylene extract of benzoic acid, toluic acid and their amides from dilute solutions containing these latter materials with caustic thereby to produce an aqueous solution of the salts of benzoic and toluic acid. This aqueous solution is further subjected to a treatment for the hydrolysis of the amides. Such hydrolysis can be effected by treating with an aqueous acid solution, but preferably by a caustic treatment whereby the amides are saponified. Following saponification, the resulting mixture is then treated with a mineral acid, as, for example, sulfuric acid or hydrochloric acid, to free the benzoic and toluic acids. The acid treating step results in the formation of an organic acid phase and an aqueous phase. The organic acid phase is separated from the aqueous phase, subjected to a water-washing treatment and then distilled.

A convenient way of forming the xylene extract is taught in copending application Serial No. 411,323, filed February 19, 1954, issued November 15, 1955, as U. S. Patent No. 2,723,995. According to this patent the filtrate or solution obtained immediately after the recovery of the dicarboxylic acid, e. g., isophthalic or terephthalic and containing small amounts of benzoic acid, toluic acid and their amides, is extracted at least once at about 150° F. to 250° F. with about 0.01 to 0.5 volumes of xylene per volume of solution.

The thusly obtained xylene extract containing about 8–10% by weight of benzoic and toluic acids and about .8% to 1.0% of their amides is contacted or mixed with a caustic solution, e. g., sodium hydroxide, of a concentration varying from about 10% to 20%, a sufficient amount of solution being employed to neutralize the carboxyl groups, that is, from a stoichiometric amount to an excess. A sufficient amount of caustic has been added when the pH reaches 7 or higher. The temperature of mixing of the caustic and xylene extract is not critical, and although room temperatures and lower can be employed, it is preferred for efficiency of mixing and reaction to employ somewhat elevated temperatures, and temperatures within about the range of 150° F. to 210° F. are satisfactory. Following neutralization, in accordance with one embodiment of the invention, the neutralized mixture is allowed to settle whereby a xylene phase and an aqueous phase containing the salts of the acids are formed.

The aqueous phase, which may be regarded as a caustic extract, is then further treated to saponify or hydrolyze the benzamide and amide of toluic acid with a caustic treatment. In carrying out this step of the process, hydrolysis or saponification of the amides is effected in the presence of a stoichiometric excess of caustic, a suitable excess being within about the range of 15% to 30%, and heating at elevated temperature, a suitable temperature ranging from the reflux temperature of the mixture to a temperature of 300° F. for a period of time sufficient to hydrolyze the amides, generally from 10 minutes to 1 hour and under sufficient pressure to maintain the mixture in the liquid state.

If desired the step of caustic extraction or neutralization of the benzoic and toluic acids and the step of hydrolysis of their amides can be combined. In this event excess caustic and elevated temperatures described in the saponification step above are suitably employed.

After the caustic extraction and saponification treatment the mixture now containing the salts of the acids benzoic and toluic is treated with a mineral acid, e. g., sulfuric or hydrochloric, to liberate the acids from their salts. This acid-springing step is advantageously carried out at a temperature above 170° F., preferably around 210° F., in order to obtain a mixture characterized by an acid phase and an organic acid melt phase, which then can be isolated by simple decantation.

The organic acid phase is next subjected to a water-washing treatment, which is preferably carried out while the organic melt phase is still hot, that is, at about 170°–220° F., after which the washed organic phase is subjected to a distillation treatment. It has been found that the portion of the organic phase distilling between 10 and 95%, which forms the heart cut, is characterized by benzoic and toluic acid values of extremely high purity.

In order further to illustrate the practice of the invention reference is made to the accompanying drawing, which is a block flow diagram of the various process steps contemplated by the invention.

A xylene feed, usually meta-xylene or para-xylene, and an aqueous oxidizing solution containing from about 1.5 to about 1.75 moles of ammonium sulfate per mole of xylene charged, and from about 0.05 to 0.3 mole of ammonium polysulfide per mole of xylene charged are passed into an oxidation zone maintained at a temperature from about 550° F. to 750° F. The residence time of this mixture in the oxidation zone is of the order of 30 minutes. The oxidation reaction product is passed from the oxidation zone to a digestion zone where it is digested for a period of from 5 to 10 minutes at a temperature of about 500° F. and at a pressure of about 1000 p. s. i. g. The digested reaction mixture passes into a stripping zone from which ammonia and hydrogen sulfide are removed overhead through line 1 and from which molten sulfur is removed through line 2. The stripped aqueous product is then passed into a decolorization zone where it is contacted with activated carbon and then to a filtering zone where it is filtered at about 200° F. to remove the carbon as a filter cake. The filtrate is then passed into an acidification zone where it is treated with sulfuric acid at a temperature of 200–250° F. to produce a slurry of phthalic acids and amides in aqueous ammonium sulfate. The resulting slurry is heated to 300 to 500° F. to hydrolyze the amides. The hydrolysis product is passed into a filtering zone where solid phthalic acid is recovered as a product. The filtrate is then passed through line 3 into xylene extraction zone 5, wherein extraction of the benzoic and toluic acid values may be effected, as already indicated, in accordance with U. S. application Serial No. 411,323, filed February 19, 1954. The aqueous phase after xylene extraction may be returned to the oxidation zone. The xylene fraction is then caustic extracted as shown in step 6 to neutralize the acids, whereupon a xylene layer and an aqueous salt solution are formed. The xylene can then, after purification in still 7, be passed into line 3 together with any desired make-up xylene, mixed with fresh filtrate in mixing zone 4 and introduced into xylene extraction zone 5.

The aqueous salt solution obtained in caustic extraction 6 is then subjected to higher temperatures and pressures as indicated by step 8, to saponify residual amides. The mixture is depressurized, cooled and then treated with a mineral acid, e. g., sulfuric, whereby an organic melt phase and a lower aqueous layer are formed as shown in step 9. The aqueous layer from step 9, containing sodium sulfate, can be treated for the recovery of the sodium sulfate. As shown in step 10, the organic melt phase from step 9 is water-washed, after which the water is removed, and if desired, employed in caustic extraction step 6. The washed organic material is then distilled as shown in step 11, and the desired fraction retained as the final product.

In further illustration of the invention the following example is given following the sequence of steps shown in the drawing.

44,500 parts aqueous filtrate containing 390 parts benzoic-toluic acids, 685 parts orthophthalic acid and 6335 parts $(NH_4)_2SO_4$ is contacted with 4020 parts xylene for 15 minutes at 180° F. The phases are then allowed to settle for 10 minutes at 180° F. After settling, an aqueous stream totaling 44,200 parts and containing 70 parts benzoic-toluic acid, 655 parts orthophthalic acid and 6335 parts $(NH_4)_2SO_4$ is drawn off. This stream can be recycled to the oxidation zone. The xylene phase from the settler totaling 4375 parts and containing 320 parts benzoic-toluic acid is contacted with 1148 parts of aqueous caustic containing 145 parts NaOH at 195° F. for ½ hour. The phases are then separated to give a xylene layer suitable for recycle to the xylene extraction step and an aqueous salt solution of the organic acids containing 34 parts excess NaOH.

Residual amides in the benzoic-toluic acids are then saponified at 300° F. and 50 p. s. i. g. for ½ hour, following which the aqueous solution is depressurized and cooled to 212° F. To the cooled stock is added 167 parts of 99% $H_2SO_4$ to give a pH of 3. The heat evolved is dissipated by evaporation of water. Upon settling, the stock then separates into an upper organic melt phase and an aqueous lower layer. The aqueous $Na_2SO_4$ layer is removed at 210° F.

Water is added to the organic melt phase at 210° F. After 10 minutes of contact at 210° F., the liquid phases are again separated. This time the organic melt phase is heavier and this stock is drawn off. The aqueous phase containing small amounts of $Na_2SO_4$ and dissolved organic acids is recycled to the caustic make-up stream in caustic extraction step 2.

The washed organic melt phase containing 40 parts water and 271 parts organic acids is charged to a still for dehydration and product distillation. The water is removed at atmospheric pressure. Then the benzoic-toluic product is distilled in a 5 plate column at 1 p. s. i. g. pressure. The overhead product is divided into cuts. A forecut containing 35 parts benzoic-toluic acid gave poor heat stability color. The heart cut contained 246 parts of organic acids and showed good heat stability color (3 Gardner melt color after 1½ hours at 482° F.). A tail cut of 15 parts acid showed a poorer heat stability color. 15 parts of material remained as still bottoms. A portion of the forecut and tail cut was used as recycle to a subsequent distillation to improve recovery of heart cut material.

Heart cut material was tested in a 34% isophthalic coconut oil alkyd. The resulting alkyd color of 250 Hazen indicated that a satisfactory quality of benzoic-toluic acids was produced.

Obviously many modifications and variations of the invention, as hereinbefore set forth, may be made without departing from the spirit and scope thereof and, therefore, only such limitations should be imposed as are indicated in the appended claim.

We claim:

A process for the recovery of benzoic and toluic acids having an amide nitrogen content of less than 0.03 percent by weight from a xylene extract containing said acids and their amides, said xylene extract being obtained by extracting with xylene an aqueous solution containing from about 0.1 to about 3 percent by weight of each of said acids, from about 0.05 to 0.5 percent by weight of the amides of said acids, and from about 5 to about 35 percent by weight of at least one material of the group consisting of sulfuric acid, ammonium sulfate and ammonium bisulfate, which comprises contacting said extract, at a temperature ranging from the reflux temperature of said extract to about 300° F. and at a pressure sufficient to maintain the reactants in the liquid state, with an amount of NaOH 15 to 30 percent in excess of that necessary to neutralize the acids and saponify the acid amides present in the extract, treating the resulting aqueous phase with a mineral acid to form an upper organic phase and a lower aqueous phase, washing the organic phase at a temperature sufficiently high to maintain said organic phase in the liquid state, and distilling the organic phase to recover benzoic and toluic acids having an amide nitrogen content of less than 0.03 percent by weight.

References Cited in the file of this patent

UNITED STATES PATENTS

| | | |
|---|---|---|
| 1,458,491 | McKee et al. | June 12, 1923 |
| 2,723,995 | Rutherford | Nov. 15, 1955 |